US007657742B2

(12) United States Patent
Yamada

(10) Patent No.: US 7,657,742 B2
(45) Date of Patent: Feb. 2, 2010

(54) CONTENT REPRODUCING APPARATUS AUTHENTICATING DETACHABLE RECORDING MEDIUM AND AUTHENTICATION CONTROL METHOD

(75) Inventor: Tomohiro Yamada, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 758 days.

(21) Appl. No.: 10/448,941

(22) Filed: May 30, 2003

(65) Prior Publication Data
US 2004/0111614 A1 Jun. 10, 2004

(30) Foreign Application Priority Data
Jun. 5, 2002 (JP) ............... 2002-163693

(51) Int. Cl.
H04L 9/32 (2006.01)

(52) U.S. Cl. ............ 713/168; 713/158; 726/27

(58) Field of Classification Search ............ None
See application file for complete search history.

(56) References Cited

U.S. PATENT DOCUMENTS

| 6,513,117 B2 * | 1/2003 | Tarpenning et al. | ......... 713/156 |
| 6,980,659 B1 * | 12/2005 | Elliott | ......... 380/277 |
| 7,174,456 B1 * | 2/2007 | Henry et al. | ......... 713/158 |
| 2007/0226807 A1 * | 9/2007 | Ginter et al. | ......... 726/27 |

FOREIGN PATENT DOCUMENTS

JP 2002-026900 1/2002

OTHER PUBLICATIONS

Computer-Generated Translation of Japanese Application Publication 2002-026900 retrieved from PAJ Database on Aug. 2, 2007.*
Formal Translation of Japanese application publication 2002-026900.*

* cited by examiner

Primary Examiner—Minh Dinh
(74) Attorney, Agent, or Firm—Gerald T. Bodner

(57) ABSTRACT

A content reproducing apparatus includes a CPU. The CPU executes an authentication process with a memory card at a time of starting reproduction. The reproducing apparatus, when succeeding in the authentication process, can obtain from the memory card a decryption key of encrypted music data. Accordingly, by decrypting encrypted content data separately obtained by use of the decryption key, it is possible to reproduce the music data. In such the authentication process, certificate data is utilized in an order which starts from registered identification numbers and, every time failing in the authentication process, is renewed to a next identification number. Consequently, an identification number of certificate data which succeeds in the authentication process is registered and utilized in a next authentication process and the subsequent.

8 Claims, 7 Drawing Sheets

FIG. 4

| SECRET DECRYPTION KEY | CERTIFICATE | IDENTIFICATION NUMBER |
|---|---|---|
| Kp(1) | KPp(1.1) | 1 |
|  | KPp(1.2) | 2 |
| Kp(2) | KPp(2.1) | 3 |
|  | KPp(2.2) | 4 |
| Kp(3) | KPp(3.1) | 5 |
|  | KPp(3.2) | 6 |
| Kp(4) | KPp(4.1) | 7 |
|  | KPp(4.2) | 8 |
| ⋮ | ⋮ | ⋮ |
| Kp(n) | KPp(n.1) | N−1 |
|  | KPp(n.2) | N |

CONTENT REPRODUCING APPARATUS AUTHENTICATING DETACHABLE RECORDING MEDIUM AND AUTHENTICATION CONTROL METHOD

BACKGROUND OF THE INVENTION

1. Field of the Invention

The present invention relates to a content reproducing apparatus. More specifically, the present invention relates to a content reproducing apparatus and an authentication control method in which an authentication process with a detachable recording medium is executed by use of certificate data and a content in the recording medium is reproduced when succeeding in the authentication process.

2. Description of the Prior Art

An example of such kind of a conventional content reproducing apparatus is disclosed in a Japanese Patent Laying-open No. 2002-269090 [H04L 9/32, G06F 12/14, G10L 19/00, H04N 5/91, H04N 5/92] laid-open on Jan. 25, 2002. As shown in FIG. 8, a data reproducing apparatus 1 is provided in a cellular phone 2, for example. The data reproducing apparatus 1 executes a reproduction process of encrypted music data stored in a memory card 3 according to an instruction from a user. A controller 4 reads authentication data {KPpx// Crtfx} KPma from an authentication data holder 6 so as to input to the memory card 3 via a memory interface 7. For example, the authentication data holder 6 holds two authentication data {KPp1//Crtf1} KPma and {KPp2/Crtf2} KPma, and the controller 4 reads the authentication data {KPp1// Crtf1} KPma and {KPp2//Crtf2} KPma in this order.

On the other hand, the memory card 3 accepts the authentication data {KPpx//Crtfx} KPma input from the cellular phone 2 and performs a decryption process thereon. That is, the accepted authentication data {KPpx//Crtfx} KPma is decrypted by a public authentication key Kpma. By utilizing a result of the decryption process, it is determined whether or not the authentication data {KPpx//Crtfx} KPma is normal authentication data. In a case the authentication data cannot be decrypted in the memory card 3, an output of unacceptability of the authentication data is applied from the memory card 3 to the controller 4. On the other hand, in a case the authentication data can be decrypted, the memory card 3 determines whether or not an obtained certificate Crtfx is included in prohibition class list data.

The certificate Crtfx is applied with an ID, and the memory card 3 determines whether or not the ID of the accepted certificate Crtfx exists in the prohibition class list data. In a case the certificate Crtfx is included in the prohibition class list data, the memory card 3 applies to the cellular phone 2, i.e., the controller 4 the output of unacceptability of the authentication data.

Thus, the memory card 3, when the authentication data cannot be decrypted by the public authentication key KPma or when the accepted certificate Crtfx is included in the prohibition class list data, outputs the unacceptability of the authentication data to the cellular phone 2. Accordingly, the controller 4, when receiving the unacceptability of the authentication data, reads next authentication data. As described above, the controller 4 reads the authentication data {KPp1//Crtf1} KPma at first and reads next (another) authentication data {KPp2//Crtf2} KPma in place of this. Then, the next authentication data is read, that is, the certificate data including the certificate Crtf1, the certificate Crtf2, . . . the certificate Crtfx in this order is read, and whereby, the above-described authentication process is repeated until it is determined that the certificate Crtfx is not included in the prohibition class list data or until all the authentication data is output.

Herein, that the certificate Crtfx is included in the prohibition class list data means that a secret decryption key Kpx as a class key is broken due to cracking or leakage. Since the memory card 3 cannot output the encrypted music data to the data reproducing apparatus 1 holding such the broken certificate, the process is set so as not to shift to a next step until it is confirmed that the certificate accepted from the cellular phone 2 is not included in the prohibition class list data.

That is, after outputting the unacceptability of the authentication from the memory card 3, the controller 4 is set to transmit another (next) authentication data to the memory card 3, and therefore, even if one or a plurality of certificates out of the certificates held by the data reproducing apparatus 1 is included in the prohibition class list data, if another certificate is not included in the prohibition class list data, it is possible to accept the encrypted content data and the license key from the memory card 3 and reproduce the music data. Thus, even if the certificate is included in the prohibition class list data due to cracking or leakage of the secret decryption key, the cellular phone 2 including the data reproducing apparatus 1 is aimed to be life-prolonged.

However, in the prior art, at a time of executing the authentication process with the memory card 3, the data reproducing apparatus 1 is set so as to utilize the certificate according to a predetermined order and therefore, there is a case even the certificate which has already been included in the prohibition class list data held by the memory card 3 and became unusable may be transmitted to the memory card 3. In this case, the memory card 3 fails in the authentication and outputs the unacceptability of the certificate data. Therefore, there occur problems that the time period, specifically, the time period spent for the decryption process of the certificate is time-wasting and the start of the reproduction of the music data (content data) is delayed uselessly.

SUMMARY OF THE INVENTION

Therefore, it is a primary object of the present invention to provide a novel content reproducing apparatus and an authentication control method.

Another object of the present invention is to provide a content reproducing apparatus and an authentication control method capable of starting reproduction of a content within a short time period.

The present invention is a content reproducing apparatus which executes an authentication process with a detachable recording medium by use of certificate data and reproduces, when succeeding in the authentication process, a content of the recording medium, comprising: an authenticator for executing the authentication process in an order which starts from certificate data corresponding to a registered identification number; a specifier for specifying an identification number of certificate data which has not yet been used when failing in the authentication process; and a renewer for renewing the registered identification number to the identification number specified by the specifier.

The content reproducing apparatus, at a time of starting reproduction, executes the authentication process with the detachable recording medium such as a memory card and etc. by use of the certificate data. When succeeding in such the authentication process, it is possible to reproduce a content (music, image and etc.) from the recording medium. In the authentication process, the certificate data is utilized in the order which starts from the certificate data corresponding to the registered identification number, and when failing in the authentication process, the identification number of the certificate data which has not yet been used is specified. When the identification number is specified, the registered identification number is renewed to the identification number specified by the specifier. That is, the identification number of the certificate data which has not yet been used in the authentication process is registered and utilized in the next authentication process and the subsequent. In other words, the authentication process is never performed by utilizing a certificate which has already become unusable now.

An authentication control method according to the present invention is applied to a content reproducing apparatus in which an authentication process is executed by utilizing certificate data with a detachable recording medium and a content of the recording medium is reproduced when succeeding in the authentication process and includes steps of: (a) executing the authentication process in an order which starts from certificate data corresponding to a registered identification number; (b) specifying an identification number of certificate data which has not yet been used when failing in the authentication process; and (c) renewing the registered identification number to the identification number specified by the specifier.

For example, the specifier specifies the identification number corresponding to the next certificate data when failing in the authentication process. At this time, the identification number is renewed and therefore, the identification number of the certificate data which succeeds in the authentication process at all times can be registered. Accordingly, at the next authentication process and the subsequent, failure of the authentication process hardly occurs so long as not registered in the prohibition list.

Furthermore, the content is encrypted for the purpose of protection by copyright, and therefore, when succeeding in the authentication process, a decryption key for decrypting the encrypted content is obtained. Accordingly, a decrypter can decrypt the encrypted content by utilizing the decryption key.

According to this invention, the certificate data which has already become unusable is not utilized in a data authentication process, and even if the certificate data corresponding to the stored identification number becomes unusable, the authentication process is never performed by utilizing the certificate data which has already become unusable, and therefore, it is possible to avoid an unnecessary authentication process. That is, it is possible to finish the authentication process in the bare minimum of time period and thereby start reproduction within a short time period.

The above described objects and other object, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing by an at-a glance chart a secret decryption key stored in a key memory of the reproducing apparatus shown in FIG. 1 embodiment and sets of certificate and identification numbers corresponding thereto;

DETAILED DESCRIPTION OF THE PREFERRED EMBODIMENTS

Figure 1:
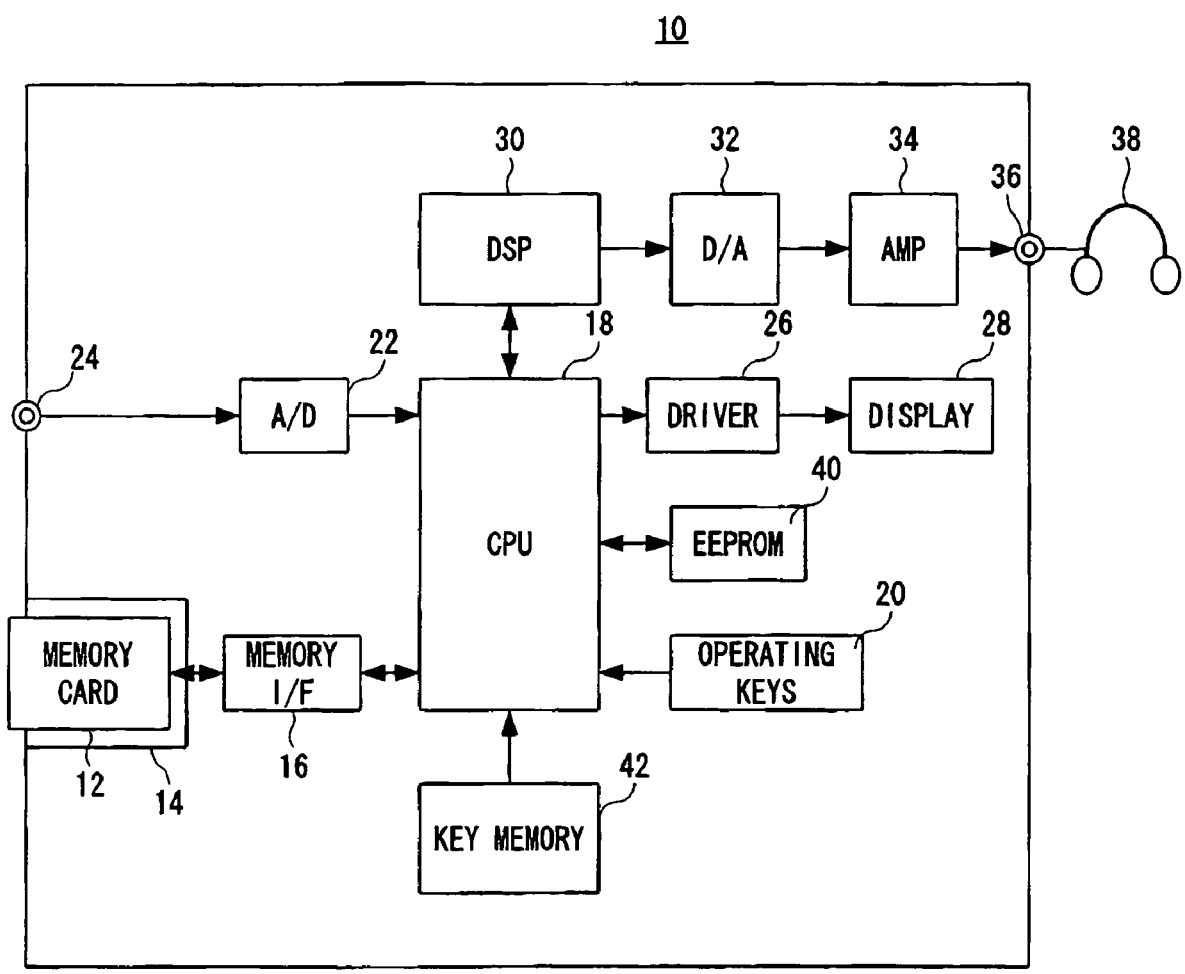
FIG. 1 is an illustrative view showing an electrical configuration of a reproducing apparatus of the present invention.

Referring to FIG. 1, a content reproducing apparatus of this embodiment (hereinafter merely referred to as "reproducing apparatus") 10 includes a memory card 12 which is detachably attached thereto. The memory card 12 is loaded in a slot 14 provided on the reproducing apparatus 10 and connected to a CPU 18 via a memory interface (I/F) 16.

Furthermore, the CPU 18 is connected with operating keys 20, and by manipulating the operating keys 20, it is possible to input an instruction such as mode switching, recording, reproducing, stop, fast forward (FF) and rewind (RW).

In addition, the CPU 18 is connected with an analog input terminal (jack terminal) 24 via an A/D converter 22. The analog terminal 24 can be connected with a music reproducing apparatus such as CD player, MD player, component stereo (mini-component stereo) and etc. although not illustrated. A music signal being an analog music signal reproduced from the music reproducing apparatus thus connected is converted into digital music data by the A/D converter 22, and the music data is subjected to a predetermined process and then transferred to the memory card 12 via the CPU 18 so as to be recorded therein.

It is noted that such the music data is protected by copyright, and there is a need to pay a copyright loyalty and therefore, a predetermined process such as encryption and etc. is adopted as described later in detail.

It is noted that a technology for recording the music data in the memory card 12 is already known and therefore, a detailed description thereof is omitted in this embodiment. Furthermore, although the illustration is omitted, the reproducing apparatus 10 is provided with a USB terminal and by connecting a personal computer (PC) thereto, the music data downloaded by the PC can be also recorded in the memory card 12.

Furthermore, the CPU 18 is connected with a liquid crystal display 28 via a driver 26. The display 28 is displayed with a current time (calendar), a state of an operation on reproducing (reproducing, stop, FF, RW and etc.), information indicating recording, a remaining amount of a battery, a volume, a reproduction list, a music name on reproducing and information relating thereto (relative information: name of singer, lyric, names of lyric writer/composer, image of album jacket), and so on.

Herein, the reproduction list means that the name of the music and etc. of the music data stored in the memory card 12 is menu (at-a-glance)-displayed. By utilizing the reproduction list, a user selects music to be reproduced.

Although described in detail later, the above-described memory card 12 is stored with at least encrypted content data (music data in this embodiment) and a content decryption key for decrypting it. Furthermore, the memory card 12 is stored with music data on which encryption is not performed. Such the music data complies with an arbitrary compression format such as MP3, AAC and etc. and is compressed at an arbitrary compression rate (bit rate). That is, encrypted music data is compressed and then, subjected to an encryption process.

Figure 2:
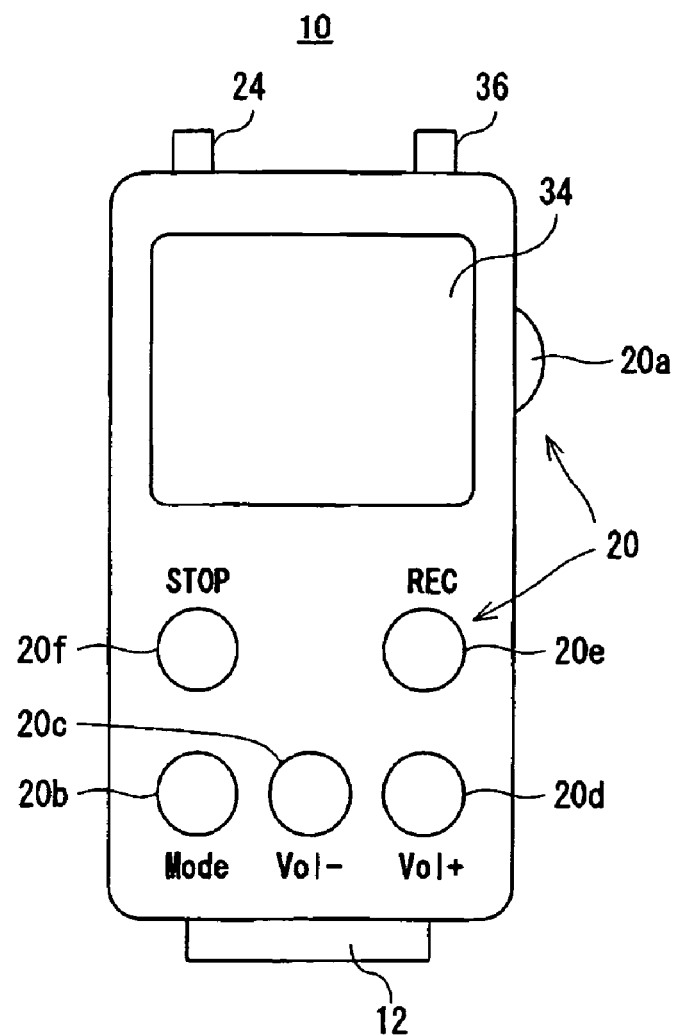
FIG. 2 is an illustrative view showing a configuration of the reproducing apparatus shown in FIG. 1 embodiment when viewed from a front thereof.

For example, the reproducing apparatus 10 is constructed as shown in FIG. 2. When the user operates a mode key 20b included in the operating keys 20, it is possible to set sound quality of the music to be recorded/reproduced or a display method of a display 28. At this time, the user can determine what kind of setting is made by viewing a display of the display 28. Furthermore, at a time of setting, by operating a jog dial 20a and volume keys 20b and 20c, a desired setting can be selected.

When the user operates a record (REC) key 20e included in the operating keys 20, the reproducing apparatus 10 starts to record. That is, the music signal (input signal) reproduced from the music reproducing apparatus connected to the input terminal 24 is input through the input terminal 24 and converted into the digital data by the A/D converter 22 so as to be applied to the CPU 18. Then, the output is encoded (subjected to a compression process) and encrypted by an instruction and a process by the CPU 18, and then transferred to the memory card 12 so as to be recorded therein.

It is noted that the compression process is executed by a DSP 30 according to an instruction from the CPU 18, and the music data complies with an arbitrary compression format such as MP3, AAC and etc. and is compressed at an arbitrary compression rate (bit rate). The music data on which the compression process is thus performed is further encrypted by the CPU 18 and then, recorded in the memory card 12 via the memory I/F 16.

Furthermore, the CPU 18, after completion of recording the encrypted music data, generates a decryption key (content decryption key) for decrypting each of the encrypted music data which has been recorded and records in the memory card 12 license data including the content decryption key, a reproduction condition of the encrypted music data, and etc.

It is noted that by operating the PC connected to the USB terminal, the encrypted music data downloaded into the PC and the above-described license data can be also recorded in the memory card 12 via the CPU 18.

Furthermore, on recording, when a stop (STOP) key 20f included in the operating keys 20 is operated, a recordable state is canceled. That is, it becomes unrecordable.

On the other hand, on reproducing, although not illustrated, a cursor for selecting the above-described reproduction list and the music (tune) can be displayed on the display 28. Herein, when the user rotates the jog dial 20a included in the operating keys 20 to any one of directions, the cursor is scrolled up and down on the screen of the display 28, and therefore, a desired tune can be selected. Next, when the jog dial 20a is pressed down (turned-on), that is, when a reproduction instruction is input, a reproduction process of the tune pointed by the cursor is started.

Thus, the CPU 18 starts the reproduction process; however, in a case of reproducing the encrypted music data, an authentication process is performed with the memory card 12 as described in detail later before starting the reproduction. In brief, since the memory card 12 is attachable to and detachable from the reproducing apparatus 10, the memory card 12 itself confirms (authenticates) whether or not the reproducing apparatus 10 is normal, that is, the reproducing apparatus 10 has a correct certificate (information).

For example, in a case of reproducing the encrypted music data, an authentication process is first performed between the reproducing apparatus 10 and the memory card 12. When the authentication is then succeeded, the encrypted music data and the content decryption key are applied to the CPU 18 from the memory card 12 via the I/F 16. The CPU 18, when receiving the encrypted music data and the content decryption key, decrypts (converts into plain text) the encrypted music data by the content decryption key and applies decrypted music data to the DSP 30. Furthermore, the CPU 18 reads decoding software which is stored in an EEPROM 40 and complies with a compression format of the music data so as to apply to the DSP 30. Accordingly, the DSP 30 decodes the music data by use of the decoding software. The decoded music data is converted into a music signal being an analogue format in a D/A converter 32. Then, the converted music signal is amplified by an audio amplifier (AMP) 34 and thereafter input to a head phone 38 from an output terminal (jack terminal) 36. Thus, the user can listen to the tune instructed to be reproduced.

Furthermore, in a case of reproducing the music data to which the encryption is not performed, when succeeding in the above-described authentication process, the CPU 18 reads the music data from the memory card 12 via the I/F 16. The CPU 18 obtains the decoding software of the music data from the EEPROM 40 and applies it to the DSP 30 together with the music data. The process and the subsequent is the same as a case of the above-described encrypted music data, and therefore, the duplicated description will be omitted.

On reproducing the music data, when the jog dial, i.e. the key 20a is rotated to one direction, the fast-forward reproduction is performed or a next tune is selected. On the other hand, when the key 20a is rotated to a reverse direction, the rewind reproduction is performed or a previous tune is selected. Furthermore, during reproducing the music data, when the jog dial 20a is depressed, the reproduction is stopped, and when depressed again, the reproduction is restarted. Furthermore, by operating the volume keys (Vol+ and Vol−) 20c and 20d included in the operating keys 20, it is possible to turning down or up a volume of the tune on reproducing. Then, when operating the stop key 20f, it is possible to suspend (stop) the reproduction of the tune.

Figure 3:
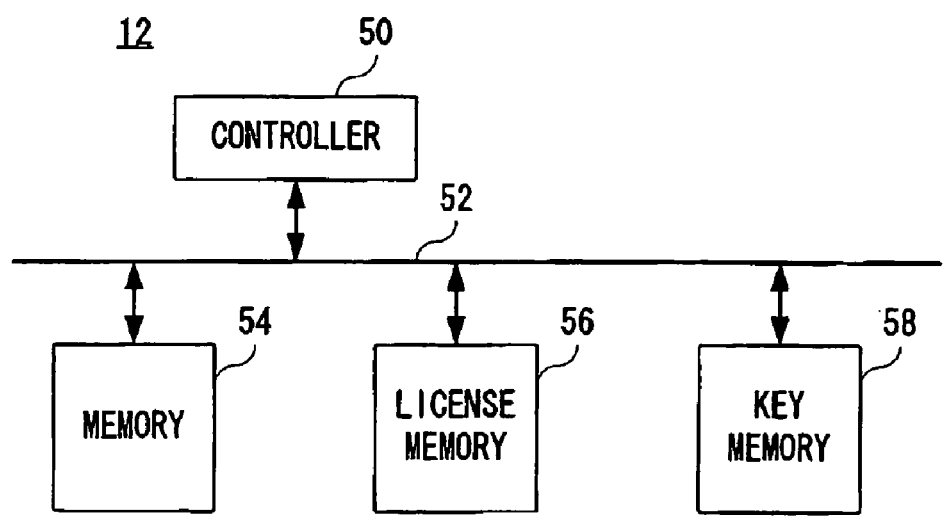
FIG. 3 is an illustrative view showing an electrical configuration of a memory card detachably provided in the reproducing apparatus shown in FIG. 1 embodiment.

The memory card 12 is, for example, a secure multimedia card and includes a controller 50 as shown in FIG. 3. The controller 50 is connected to a memory 54, a license memory 56 and a key memory 58 via an internal bus 52. The memory 54 stores data which can be freely exchanged such as the above-described encrypted music data, the music data on which the encryption is not performed and etc. Furthermore, the license memory 56 stores data required to protect copyright such as the content decryption key, i.e., the license data required to reproduce the encrypted music data, and data (expiration list data) listing the IDs of the certificates (certificate IDs) having already been prohibited to be used (expired or lapsed). Furthermore, the key memory 58 stores the public authentication key to be used for a mutual authentication (encryption) process for performing exchange of the license data. The license memory 56 and the key memory 58 are formed in an area or areas (secure area) inaccessible through an operation by the user.

Herein, the music data on which the encryption is not performed includes the music data corresponding to a short tune, i.e., a part of tune to be delivered or being delivered now for advertising the tune, or the music data corresponding to the tune of one's own composition provided by an individual free.

Thus, the encrypted music data and the music data on which the encryption is not performed are mixed; however, whether the encrypted music data or not can be easily known (determined) because information (tag) for determining whether or not the encryption is performed on the encrypted music data or a header of the music data is applied.

In this embodiment, the license data means a content decryption key (Kc(n)), control information (AC1), control information (AC2), a license ID and a content ID. The content decryption key (Kc(n)) (n is a natural number equal to or more than 1) is a key for decrypting the encrypted music data and is individually provided with respect to the encrypted music data of n.

Furthermore, the control information (AC1) includes allowance information for determining whether or not the content decryption key (Kc(n)) stored in the memory card 12 may be output and number of times restricting information for restricting the number of times of reproduction.

It is noted that the number of times restricting information can be set by 1 byte data, that is, can be set between "00" and "FF". If the number of times restricting information is "00", irreproducibility is indicated while "FF" indicates that the number of reproductions is unlimited. Furthermore, the number of reproductions is restricted between "01" and "FE". Precisely, the number of outputs of the content decryption key (Kc(n)) is restricted.

Furthermore, the control information (AC2) is information indicative of a reproduction restriction such as a reproduction term and etc. at a side of the reproduction circuit. More specifically, the reproduction term restricts a reproducible date and time.

In addition, the license ID is a management code capable of specifying issuance of a license, and the content ID is an identification code for identifying the content data, i.e., (encrypted) music data.

Such the license data and the above-described expiration list data are obtained when the PC downloads the encrypted music data. In addition, information relating the music data, i.e., associated information is also downloaded together with the encrypted music data.

It is noted that the expiration list data may download all the expiration lists every time; however, an amount of data becomes so large and therefore, only a difference between the expiration list previously downloaded and a latest expiration list may be downloaded.

In a case of obtaining the music data from the music CD loaded in the music reproducing apparatus, the reproducing apparatus 10 encrypts the music data and generates the license data and the expiration list data so as to input to the memory card 12.

In explaining the reproducing apparatus 10 in detail, as shown in FIG. 1, the CPU 18 is connected to the memory card 12 via the I/F 16, exchanges a key with the memory card 12 so as to obtain the content decryption key (Kc(n)) and the control information (AC2) and executes the mutual authentication. Furthermore, the CPU 18 is connected with a key memory 42 and the DSP 30 as a content decryption processing circuit. The key memory 42 stores certificate data (KPp(n,a)) and a secret decryption key (Kp(n)). The CPU 18 obtains the encrypted music data ({Data}Kc(n)) from the memory card 12 in addition to the content decryption key (Kc(n)) and decrypts (converts into the plain text) the encrypted music data ({Data}Kc(n)) by use of the content decryption key (Kc(n)). Then, the music data (Data) decrypted by a predetermined decoding software in the DSP 30 is converted into the analog music signal in the D/A converter 32, amplified by the AMP 34 and then, output to the output terminal 36.

It is noted that the certificate data (KPp(n,a)) is synonymous with the public encryption key inherent in a class (kind, a manufacturing lot and etc.) of the reproducing apparatus 10 and opposite to the secret decryption key (Kp(n)).

Furthermore, {X}Y represented in the embodiment means information that X is decryptably encrypted by a key Y. The same is true for the following description in the embodiment.

Herein, two certificate (data) utilized in the mutual authentication process (authentication process) described in detail later is provided in correspondence with 1 secret decryption key, and the both are corresponded with each other as shown in the left and the middle columns in FIG. 4. That is, in the key memory 42, the certificate data (KPp(n,a)) as a class public key is stored in correspondence to the secret decryption key (Kp(n)). In this embodiment, n is a natural number, and a is 1 or 2.

Such the secret decryption key (Kp(n)) may be leaked or cracked (broken) due to an undesirable operation and etc. and therefore, providing a plurality of the keys (n in this embodiment) as shown in FIG. 4 allows the reproducing apparatus 10 to be increased in life. Such a set of the secret decryption key (Kp(n)) and the certificate data (Pp(n,a)) is assigned with identification number N (natural number) as shown in the right column in FIG. 4 and utilized in ascending numeric order in the authentication process.

However, when the certificate which has already been unusable due to the decoding and etc. described above is utilized in the authentication process, the authentication certainly fails and therefore, it becomes a time-wasting process. That is, in the authentication process, the above-described certificate data (KPp(n,a)) is applied to the memory card 12, and it is detected (determined) whether or not the certificate ID of the certificate data (KPp(n,a)) is included in the expiration list data so as to determine whether or not the certificate is correct (valid).

It takes several seconds (2 to 3 seconds) for such the authentication process. For example, in a case a secret decryption key (Kp(1)) cannot be used at all and a part of a secret decryption key (Kp(2)) cannot be used, that is, certificate data (KPp(1,1)), (KPp(1,2)) and (KPp(2,1)) respectively corresponding to the identification numbers 1 to 3 cannot be used, executing the authentication process from the certificate data (KPp(1,1) corresponding to the identification number 1 in order causes a failure three times in the authentication process and causes waste of time period of about 10 seconds. That is, it takes much time period by the start of the reproduction.

To avoid this, this embodiment is the same as the prior art in that the certificate data (KPp(n,a)) is utilized in ascending numeric order of the identification number N; however, the identification number N of a useable certificate is stored in the EEPROM 40, and if the certificate data (KPp(n,a)) becomes unusable, i.e., if failing in the authentication process, by renewing identification number N, (next) certificate data (KPp(n,a)) corresponding to the renewed identification number N is utilized in the authentication process. Furthermore, in the next authentication process and the subsequent, with referring to the identification number N stored in the EEPROM 40, the authentication process is performed from the certificate data (KPp(n,a)) corresponding to the identification number N in order and therefore, the certificate data (KPp(n,a)) which has already been unusable is never utilized. Thus, it is possible to omit waste of time period.

Figure 5:
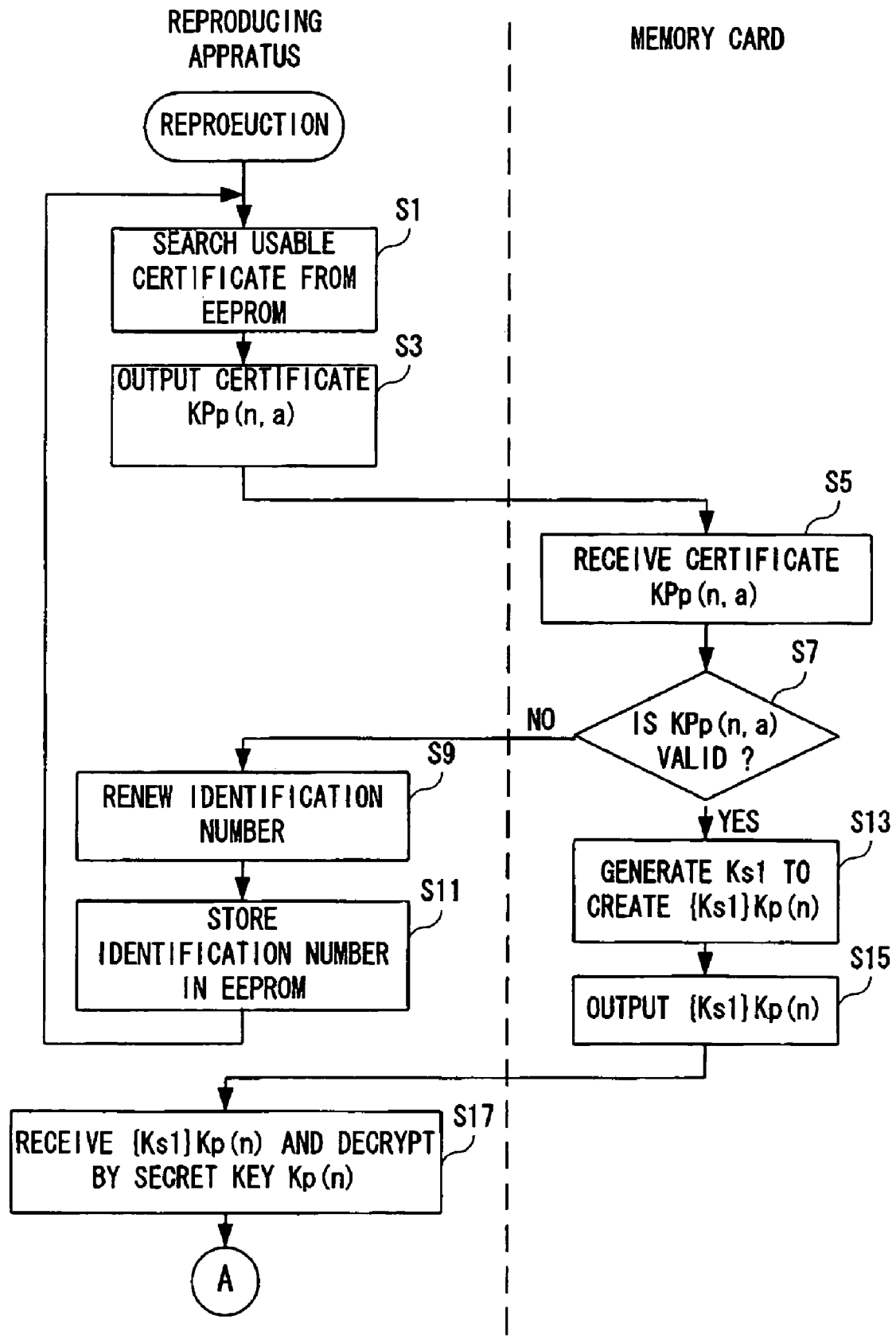
FIG. 5 is a flowchart showing a part of a reproducing process of a CPU and a DSP of the reproducing apparatus, and a controller of the memory card.
Figure 7:
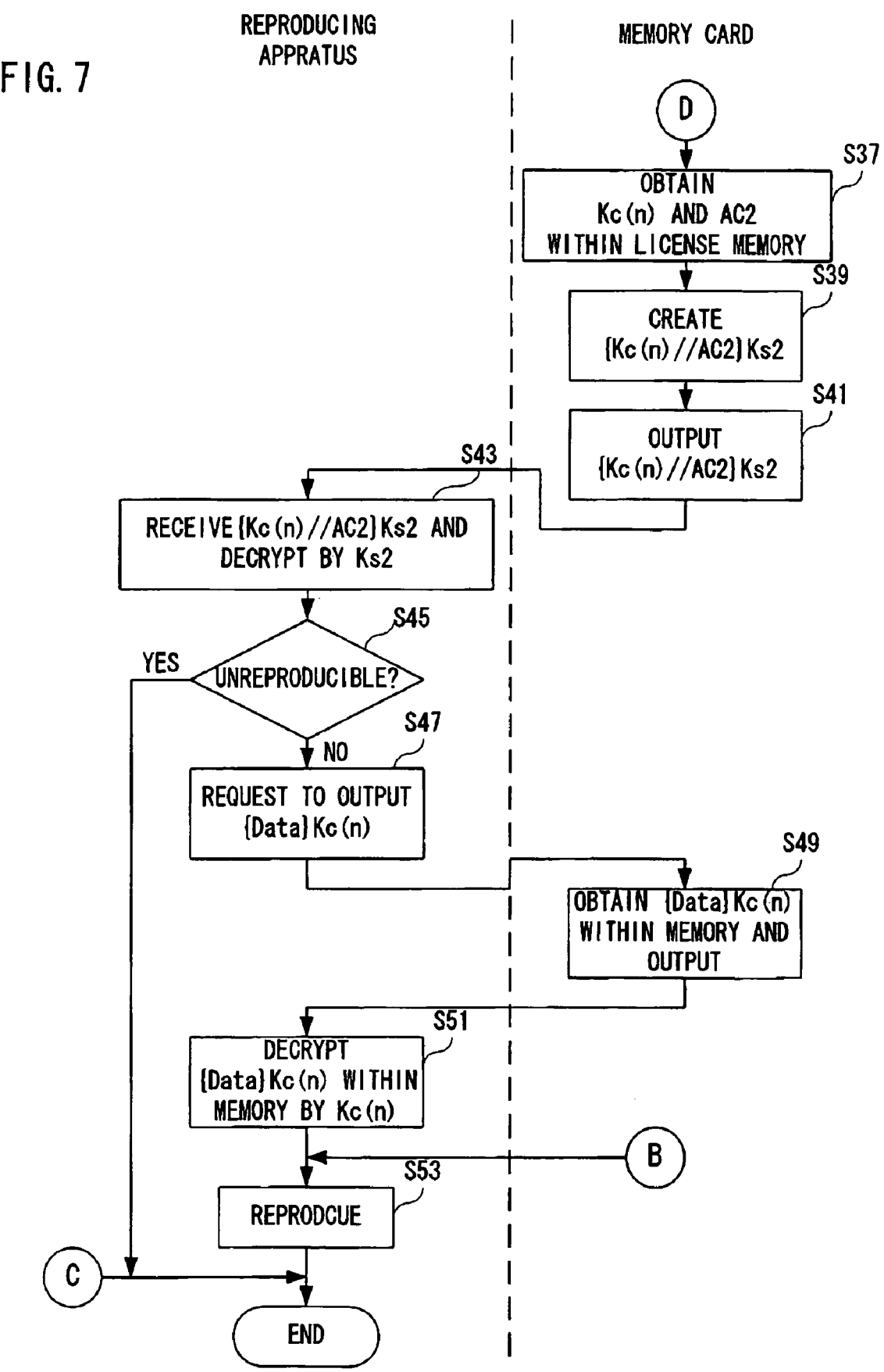
FIG. 7 is a flowchart showing the other part of the reproducing process of the CPU and the DSP of the reproducing apparatus, and the controller of the memory card.
Figure 8:
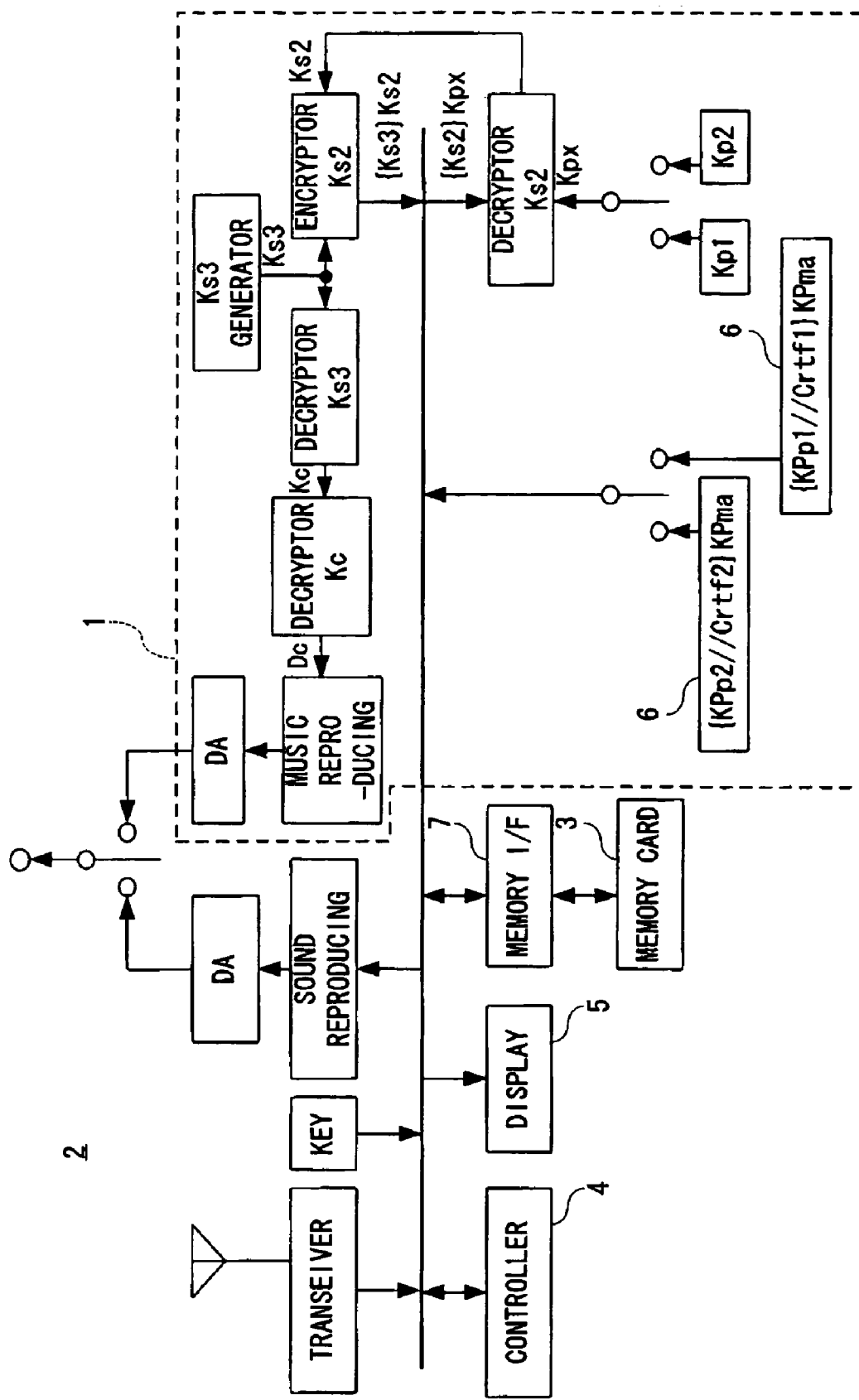
FIG. 8 is an illustrative view showing one example of an electrical configuration of a conventional data reproducing apparatus.

More specifically, the reproduction process is executed according to flowcharts shown in FIG. 5 or FIG. 7. It is noted that the reproduction process is executed by the CPU 18 and the DSP 30 provided in the reproducing apparatus 10 and the controller 50 provided in the memory card 12, and therefore, a partition is provided by a dotted line so as to facilitate the understanding of the processes in the reproducing apparatus 10 and the memory card 12.

Referring to FIG. 5, when the user selects a desired tune (music) and inputs a reproduction instruction, the CPU 18 starts to process and searches a usable certificate from the EEPROM 40 in a step S1. That is, an identification number N stored in the EEPROM 40 is detected. In a succeeding step S3, the CPU 18 reads from the key memory 42 certificate data (KPp(n,a)) corresponding to the detected identification number N so as to output to the memory card 12.

Accordingly, the controller 50 receives the certificate data (KPp(n,a)) in a step S5 and determines whether or not the certificate data (KPp(n,a)) is valid in a step S9. More specifically, the controller 50 determines whether or not a certificate ID of the certificate data (KPp(n,a)) is included in the expiration list with referring to the expiration list data within the license memory 56.

If "NO" in a step S7, that is, if the certificate ID of the certificate data (KPp(n,a)) is included in the expiration list data, although not illustrated, the controller 50 notifies the CPU 18 of unacceptability of the certificate, and whereby, the CPU 18 determines that the certificate data (KPp(n,a)) is invalid and renews (increments the N) the identification number N in the step S9. Succeedingly, the CPU 18 stores (rewrites) the renewed identification number N in the EEPROM 40 in a step S11 and then, the process returns to the step S1. That is, in a case the certificate is invalid (unusable), the CPU 18 determines the authentication process fails, and renews the identification number N, and then executes the authentication process again by utilizing a certificate corresponding to the renewed (next) identification number.

On the other hand, if "YES" in the step S7, that is, if the certificate ID corresponding to the certificate data (KPp(n,a)) is not included in the expiration list data, the controller 50 determines that the certificate data (KPp(n,a)) is valid, generates a common key (Ks1) inherent in a session and encrypts the generated common key (Ks1) by utilizing the certificate data (KPp(n,a)) in a step S13. Thus, {KS1}KPp(n,a) capable of being decrypted by a secret decryption key (kp(n)) which is stored in the key memory 42 and opposite to the certificate data (KPp(n,a)) is generated. Actually, {Ks1}Kp(n) is generated. Then, the controller 50 outputs the {Ks1}Kp(n) to the reproducing apparatus 10 in a step S23.

Thus, if the certificate is valid, it is determined the authentication process is succeeded and then, the process shifts to a process in a next step. That is, in this case, the identification number N is not renewed and therefore, it can be said that the identification number N is specified to the identification number previously renewed. It is noted that if the identification number N within the EEPROM 40 is not renewed in the current reproduction process, it can be said that the identification number N is specified again.

Figure 6:
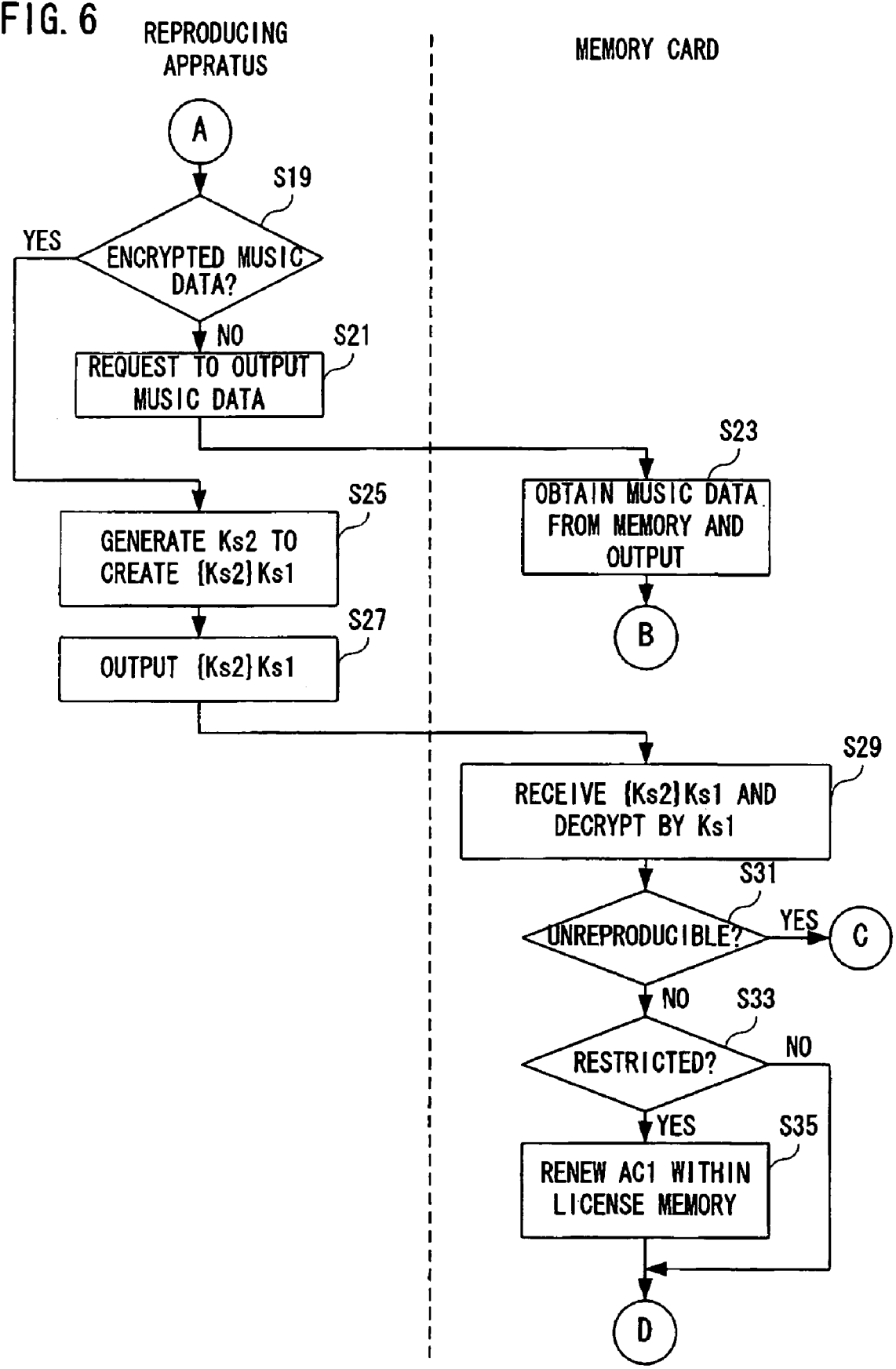
FIG. 6 is a flowchart showing another part of the reproducing process of the CPU and the DSP of the reproducing apparatus, and the controller of the memory card.

Succeedingly, the CPU 18 receives the {Ks1}Kp(n) and decrypts (converts into the plain text) the {Ks1}Kp(n) by the secret decryption key (kp(n)) stored in the key memory 42 in a step S17. As shown in FIG. 6, it is determined whether or not the music data of which a reproducing instruction is required is the encrypted music data in a following step S19. If "NO" in the step S19, that is, if it is not the encrypted music data, an output request of the music data of which the reproducing instruction is required is transmitted to the memory card 12 in a step S21. Accordingly, in a step S23, the controller 50 obtains the music data from the memory 54 so as to output to the reproducing apparatus 10. Thereafter, a reproduction process is performed in a step S53 as shown in FIG. 7.

On the other hand, if "YES" in the step S19, that is, if the encrypted music data, a common key (ks2) inherent in the session is generated, and the common key (ks1) is encrypted by the common key (ks2) in a step S25. That is, {Ks2}Ks1 is generated. Succeedingly, the {Ks2}Ks1 is output to the memory card 12 in a step S27.

In a step S29, the controller 50 receives the {Ks2}Ks1 and decrypts (converts into the plain text) it by the common key (Ks1). Therefore, the common key (Ks2) is obtained. In a following step S31, the controller 50 determines whether irreproducible or not on the basis of the control information (AC1). If "YES" in the step S31, that is, if an output of the content decryption key (Kc(n)) of the control information (AC1) is not allowed, or if the output of the content decryption key (Kc(n)) is allowed while the number of times restricting information is "00", it is determined to be irreproducible and then, the process is ended as shown in FIG. 7.

On the other hand, if "NO" in the step S31, that is, the output of the content decryption key (Kc(n)) is allowed and the number of times restricting information is other than "00", it is determined whether or not the number of reproduction times is restricted in a step S33. If "NO" in the step S33, that is, if the number of times restricting information is "FF" and the reproduction times is not limited, the process directly proceeds to a step S37 shown in FIG. 7. On the other hand, if "YES" in the step S33, that is, if the number of times restricting information is in "01" to "FE", it is determined the number of reproduction times is restricted and the number of times restricting information within the license memory 56 is renewed (counted down) in a step S35 and then, the process proceeds to the step S37.

In the step S37 shown in FIG. 7, the controller 50 obtains the content decryption key (Kc(n)) within the license memory 56 and the control information (AC2) of the reproducing apparatus 10, and encrypts the content decryption key (Kc(n)) and the control information (AC2) of the reproducing apparatus 10 by the common key (Ks2) inherent in the session obtained in advance in a step S39. Accordingly, {Kc(n)//AC2}Ks2 is generated. Then, the controller 50 outputs the {Kc(n)//AC2}Ks2 to the reproducing apparatus 10 in a step S41.

It is noted that a representation of {X//Y}Z means information that X and Y are decryptably encrypted by the key Z. This is true hereunder through the embodiment.

Accordingly, the CPU 18 obtains the {Kc(n)//AC2}Ks2 and decrypts (converts into the plain text) the {Kc(n)//AC2}Ks2 by the common key (Ks2) in a step S43. Succeedingly, the CPU 18 determines whether irreproducible or not on the basis of the control information (AC2) in a step S45. That is, it is determined whether or not a time limit of reproduction in the reproducing apparatus 10 has been passed with referring to time period information applied from a timer not shown. If "YES" in the step S45, that is, if the time limit of the reproduction has been passed, the process is directly ended. On the other hand, if "NO" in the step S45, that is, if the time limit of the reproduction has not been passed, the CPU 18 requests the memory card 12 to output the encrypted music data ({Data}Kc(n)) in a step S47. Correspondingly thereto, the controller 50 obtains the encrypted music data ({Data}Kc(n)) within the memory 54 so as to output to the reproducing apparatus 10 in a step S49.

Correspondingly thereto, the CPU 18 decrypts (converts into the plain text) the encrypted music data ({Data}Kc(n)) by use of the content decryption key (Kc(n)) previously obtained (in the step S43) in a step S51. Then, the CPU 18 applies to the DSP 30 the music data and the decoding software for decoding it in a step S53. Thereupon, the music data is reproduced according to the above-described process and thereafter, the CPU 18 ends the reproducing process.

It is noted that although the decoding software is applied to the DSP 30 after decrypting the encrypted music data in this embodiment, the decoding software may be applied before decrypting the encrypted music data.

According to the embodiment, since the authentication process utilizing the certificate which has already been invalid is hardly required, it is possible to omit a useless authentication process and to start the reproduction within a short time period.

It is noted that although the encryption and the decryption processes are performed by the CPU of the reproducing apparatus and the controller of the memory card in this embodiment, such the encryption and decryption processes are relatively large in amount and high in load and therefore, a processor or logic dedicated to such the processes may be provided, respectively.

Furthermore, although the decoding software for decoding the music data is stored in the EEPROM of the reproducing apparatus in this embodiment, it may be possible to provide a dedicated ROM, or to store the same in a memory within the memory card.

In addition, n of the secret decryption keys (2n of certificates) are provided in this embodiment, and the larger the n is, the longer the life of the reproducing apparatus is; however, if a capacity of the key memory becomes excessive, the reproducing apparatus itself becomes expensive and large. Therefore, there is a need to determine the value so as to realize life-extension of the reproducing apparatus and lowering cost (or downsizing) of the reproducing apparatus.

In addition, the content data is not limited to the music data and includes various data protected by copyright such as image data, map data, document data and etc. In a case of reproducing such the image data, the map data and the document data, respective of an image, a map, and a document are displayed on the display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content reproducing apparatus which executes multiple authentication processes with a recording medium by use of certificate data and reproduces, when succeeding in said authentication processes, a content of said recording medium, said multiple authentication processes including a current authentication process and a subsequent authentication process which occurs subsequent to said current authentication process, comprising:

a first non-volatile memory for storing one identification number indicating certificate data that is used in said current authentication process;

a second non-volatile memory for storing a plurality of certificate data in an ascending order according to an identification number identifying each certificate data;

an authenticator for executing said current authentication process with said recording medium by use of the certificate data retrieved from said second non-volatile memory according to the identification number stored in said first non-volatile memory; and a renewer for renewing, when failing in said current authentication process, the identification number stored in said first non-volatile memory to an identification number that indicates next unused certificate data in the ascending order, which has not been used prior to said current authentication process, such that use of said next unused certificate data results in a succeeding in said current authentication process, the authenticator using first in said subsequent authentication process the identification number indicating certificate data that results in the succeeding in said current authentication process, the authenticator not using in said subsequent authentication process an identification number indicating certificate data that results in a failing in said current authentication process.

2. A content reproducing apparatus according to claim 1, wherein the content is recorded in said recording medium in an encrypted manner, and said content reproducing apparatus further comprising a decrypter for decrypting the content by a decryption key obtained by the authentication process.

3. An authentication control method executed in a content reproducing apparatus which executes multiple authentication processes with a recording medium by use of certificate data and reproduces, when succeeding in said authentication processes, a content of said recording medium, said multiple authentication processes including a current authentication process and a subsequent authentication process which occurs subsequent to said current authentication process, comprising steps of:

(a) storing in a first non-volatile memory one identification number indicating certificate data that is used in said current authentication process;

(b) storing in a second non-volatile memory a plurality of certificate data in an ascending order according to an identification number identifying each certificate data;

(c) executing by an authenticator said current authentication process with said recording medium by use of the certificate data retrieved from said second non-volatile memory according to the identification number stored in said first non-volatile memory;

(d) determining whether or not said current authentication process has failed; and (e) renewing by a renewer, when failing in said current authentication process, the identification number stored in said first non-volatile memory to an identification number that indicates next unused certificate data in the ascending order, which has not been used prior to said current authentication process, such that use of said next unused certificate data results in a succeeding in said current authentication process, the identification number indicating certificate data that results in the succeeding in said current authentication process being used first in said subsequent authentication process by the authenticator, an identification number indicating certificate data that results in a failing in said current authentication process not being used in said subsequent authentication process by the authenticator.

4. An authentication control method according to claim 3, wherein the content is recorded in said recording medium in an encrypted manner, and the authentication control method further comprising the step of (f) decrypting the content by a decryption key obtained by the authentication process.

5. A content reproducing apparatus according to claim 1, wherein said recording medium is detachable.

6. An authentication control method according to claim 3, wherein said recording medium is detachable.

7. A content reproducing apparatus according to claim 1, wherein said renewer renews the identification number in said first non-volatile memory when there is at least one unused certificate available.

8. An authentication control method according to claim 3, wherein said renewing step is executed by said renewer when there is at least one unused certificate available.

* * * * *